US008373994B2

(12) United States Patent
Kitamura et al.

(10) Patent No.: US 8,373,994 B2
(45) Date of Patent: Feb. 12, 2013

(54) ELECTRONIC APPARATUS INCLUDING AT LEAST TWO ELECTRICALLY-CONNECTABLE CONNECTORS

(75) Inventors: Tomoko Kitamura, Ome (JP); Tomohiro Hamada, Tachikawa (JP); Tsutomu Iwaki, Hanno (JP); Toshio Konno, Akiruno (JP); Kohei Wada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 12/908,787

(22) Filed: Oct. 20, 2010

(65) Prior Publication Data
US 2011/0157850 A1 Jun. 30, 2011

(30) Foreign Application Priority Data
Dec. 25, 2009 (JP) ................................. 2009-296142

(51) Int. Cl.
*H05K 5/00* (2006.01)
(52) U.S. Cl. ....................................................... 361/752
(58) Field of Classification Search .................. 361/752, 361/679.31, 749, 756; 439/77
See application file for complete search history.

(56) References Cited

U.S. PATENT DOCUMENTS
8,040,670 B2 10/2011 Tatsukami
2008/0057752 A1* 3/2008 Horikiri ............................ 439/77
2009/0040705 A1 2/2009 Tatsukami
2011/0002213 A1 1/2011 Ogatsu et al.
2011/0222230 A1 9/2011 Tatsukami FOREIGN PATENT DOCUMENTS
| JP | 2002-244765 A | 8/2002 |
| JP | 2005-197119 A | 7/2005 |
| JP | 2006-309805 A | 11/2006 |
| JP | 2009-043355 | 2/2009 |
| JP | 2009-199698 | 9/2009 |
| JP | 2009-223983 | 10/2009 |
| WO | WO 2009/116315 | 9/2009 |

OTHER PUBLICATIONS

Notice of Reasons for Rejection mailed by the Japan Patent Office on Jan. 4, 2011 in corresponding Japanese patent app. No. 2009-296142 in 7 pages.
Final Notice of Rejection mailed by the Japan Patent Office on May 10, 2011 in corresponding Japanese patent app. No. 2009-296142 in 9 pages.

* cited by examiner

*Primary Examiner* — Jeremy Norris
*Assistant Examiner* — Tremesha S Willis
(74) *Attorney, Agent, or Firm* — Knobbe, Martens, Olson & Bear, LLP

(57) ABSTRACT

According to one embodiment, an electronic apparatus includes a housing, a circuit board in the housing, a module, a holder, and a buffer. The housing includes a wall. The circuit board includes a first connector. The module includes a second connector configured to engage with the first connector. The holder holds the module. The buffer is configured to be interposed between the wall and the holder such that a gap remains between the first connector and the second connector in a range in which the first connector is electrically connected to the second connector.

16 Claims, 10 Drawing Sheets

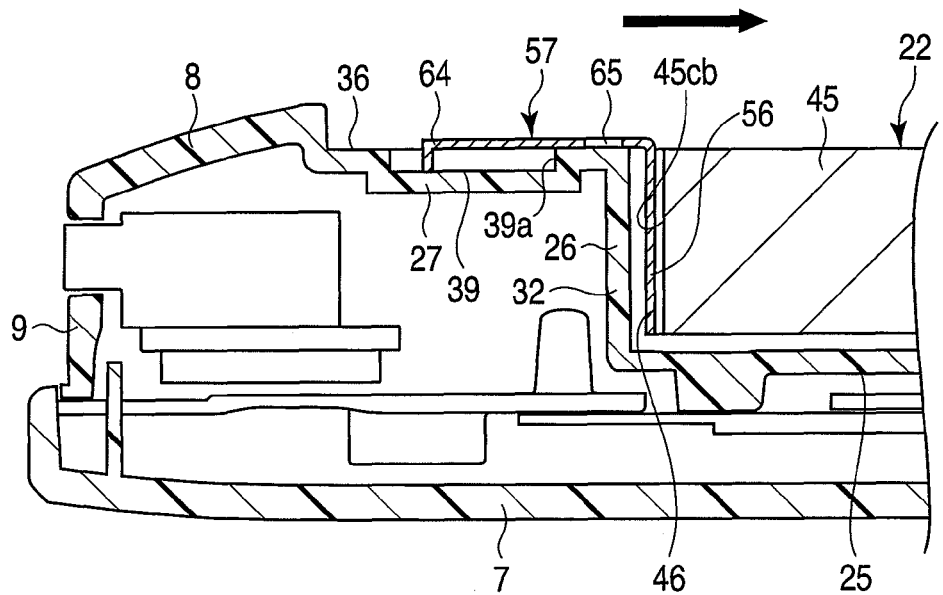
F I G. 12
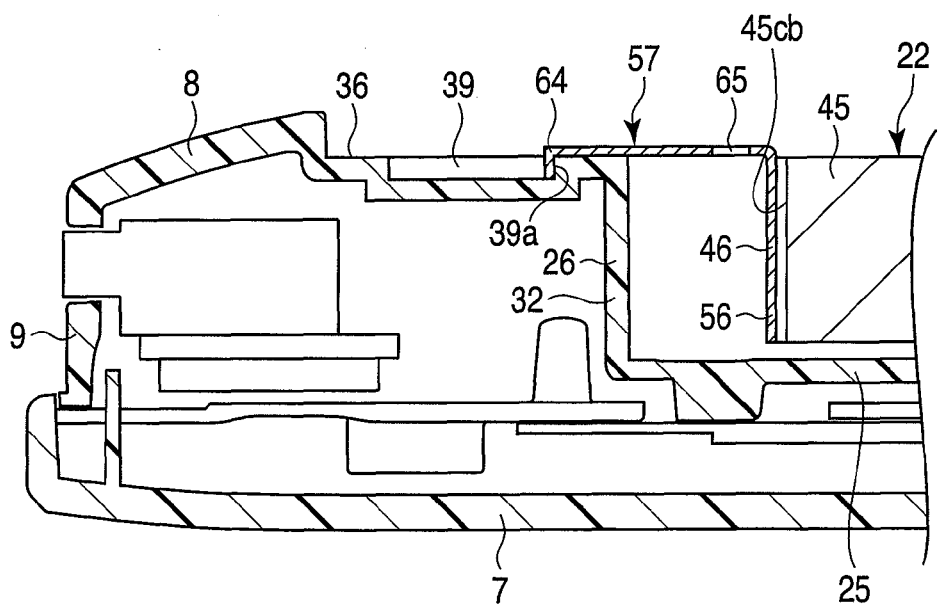
F I G. 13

ELECTRONIC APPARATUS INCLUDING AT LEAST TWO ELECTRICALLY-CONNECTABLE CONNECTORS

CROSS-REFERENCE TO RELATED APPLICATIONS

This application is based upon and claims the benefit of priority from Japanese Patent Application No. 2009-296142, filed Dec. 25, 2009; the entire contents of which are incorporated herein by reference.

FIELD

Embodiments described herein relate generally to an electronic apparatus including a connector.

BACKGROUND

Electronic apparatuses, such as notebook PCs, include, for example, a module such as an HDD (Hard disk drive). The module is connected to a connector of a circuit board through a flexible cable. When a strong impact is applied from the outside, the impact is absorbed by the flexible cable.

Jpn. Pat. Appln. KOKAI Publication No. 2005-197119 discloses a connector for a card. A card receiver that comes into contact with the front surface of a card is provided in a receiving surface of a header.

BRIEF DESCRIPTION OF THE DRAWINGS

A general architecture that implements the various feature of the embodiments will now be described with reference to the drawings. The drawings and the associated descriptions are provided to illustrate embodiments and not to limit the scope of the invention.

FIG. 12 is an exemplary cross-sectional view illustrating an attachment portion taken along a line F12-F12 of FIG. 5;

FIG. 13 is an exemplary cross-sectional view illustrating an attachment portion taken along a line F13-F13 of FIG. 6;

DETAILED DESCRIPTION

Various embodiments will be described hereinafter with reference to the accompanying drawings. In general, according to one embodiment, an electronic apparatus comprises a housing, a circuit board in the housing, a module, a holder, and a buffer. The housing comprises a wall. The circuit board includes a first connector. The module comprises a second connector configured to engage with the first connector. The holder holds the module. The buffer is configured to be interposed between the wall and the holder such that a gap remains between the first connector and the second connector in a range in which the first connector is electrically connected to the second connector.

Hereinafter, exemplary embodiments applied to a notebook personal computer (hereinafter, referred to as a notebook PC) will be described with reference to the accompanying drawings.

FIGS. 1 to 13 show an electronic apparatus 1 according to a first embodiment. The electronic apparatus 1 is, for example, a notebook PC. However, electronic apparatuses to which the embodiment can be applied are not limited thereto. The embodiment can be widely applied to various kinds of electronic apparatuses, such as a display device (e.g., television), a PDA (Personal Digital Assistant) and a game device.

Figure 1:
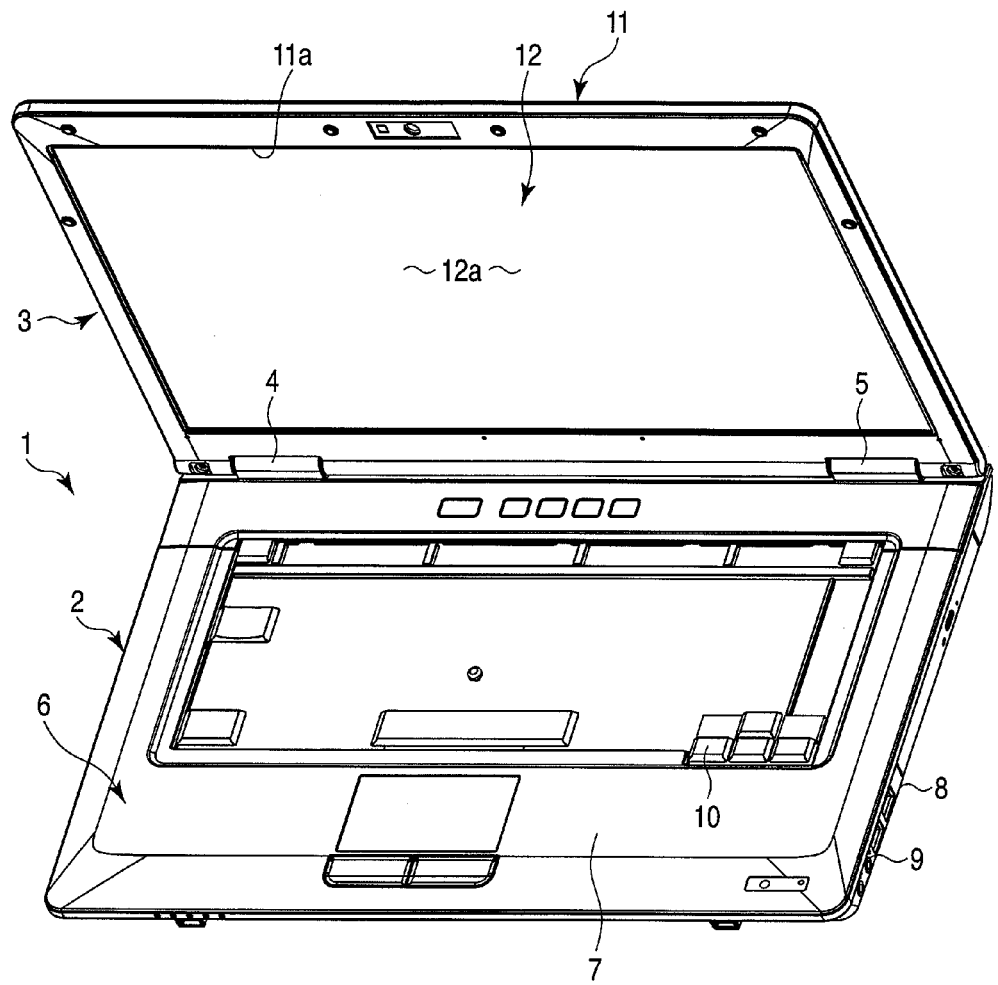
FIG. 1 is an exemplary perspective view illustrating an electronic apparatus according to a first embodiment.

As shown in FIG. 1, the electronic apparatus 1 includes a main unit 2, a display unit 3, and first and second hinges 4 and 5. The main unit 2 is an electronic apparatus body comprising a main board. The main unit 2 includes a housing 6 (main housing). The housing 6 has a flat box shape including an upper wall 7, a lower wall 8, and a circumferential wall 9. Each of the upper wall 7, the lower wall 8, and the circumferential wall 9 is an example of an "outer wall".

The lower wall 8 faces a desk surface when the electronic apparatus 1 is placed on a desk. The lower wall 8 is substantially parallel to the desk surface. The upper wall 7 is opposite to the lower wall 8 with a space therebetween and extends substantially in parallel (that is, substantially in a horizontal direction) to the lower wall 8. A keyboard 10 is provided on the upper wall 7. Only some keys of the keyboard 10 are shown. The circumferential wall 9 rises with respect to the lower wall 8, and connects an edge portion of the lower wall 8 and an edge portion of the upper wall 7.

As shown in FIG. 1, the display unit 3 includes a display housing 11 and a display device 12 in the display housing 11. The display housing 11 includes a relatively large opening portion 11a through which a display screen 12a of the display device 12 is exposed to the outside.

The display unit 3 is rotatably (openably) connected to the rear end portion of the main unit 2 by the first and second hinges 4 and 5. In this way, the display unit 3 can be pivoted between a closed position where the display unit 3 falls and covers the main unit 2 from the upper side and an opened position where the display unit 3 rises with respect to the main unit 2.

Figure 2:
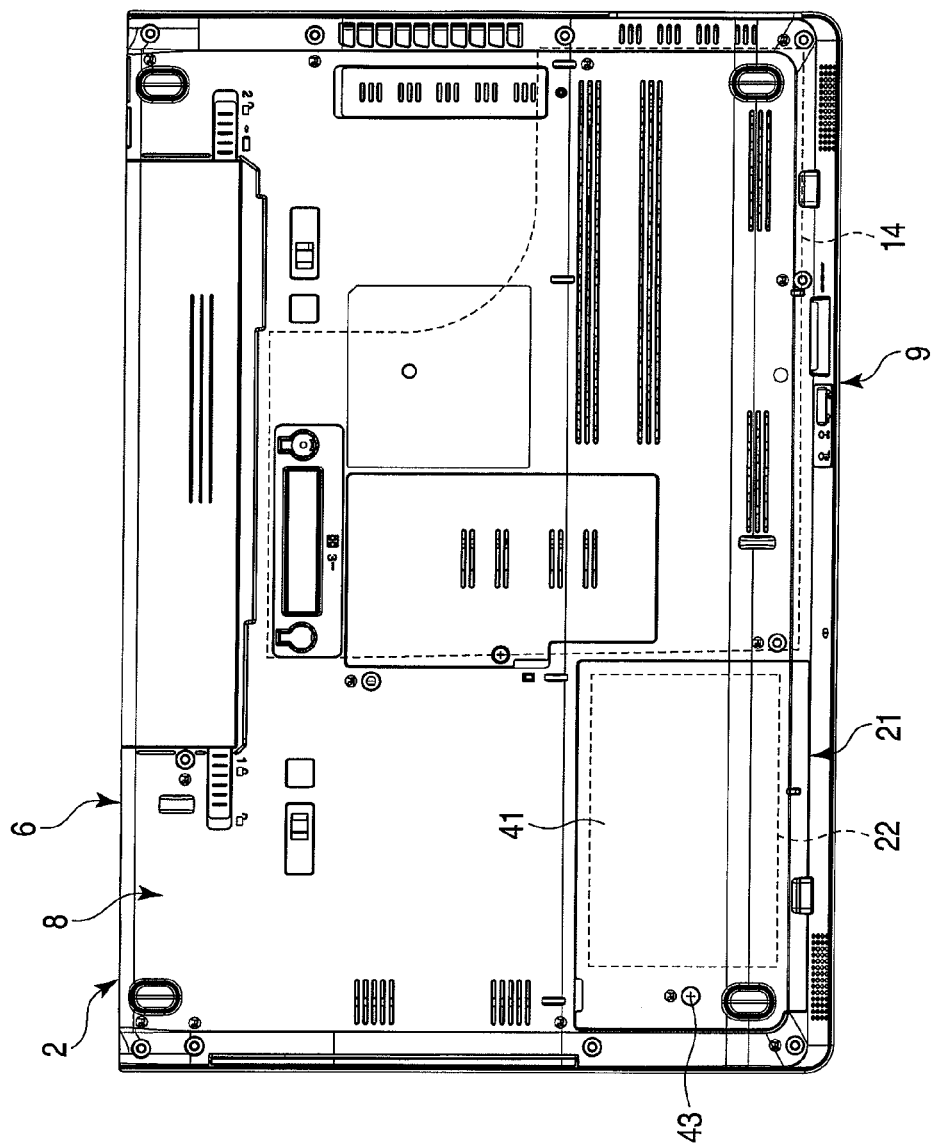
FIG. 2 is an exemplary plan view illustrating a lower wall of the electronic apparatus shown in FIG. 1.
Figure 7:
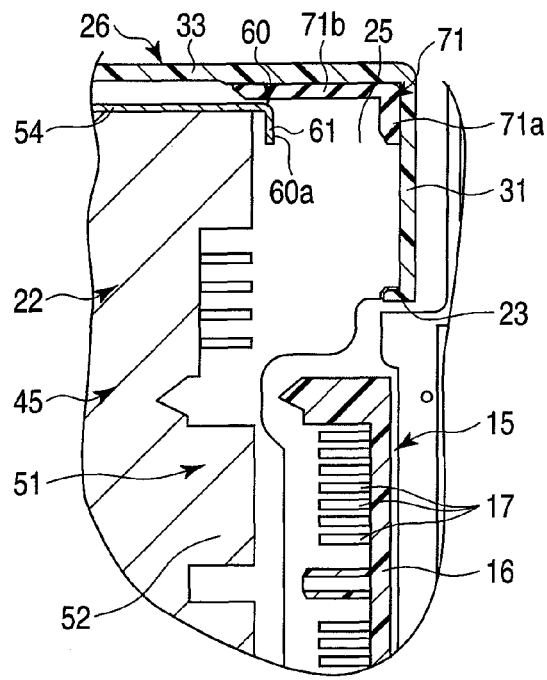
FIG. 7 is an exemplary cross-sectional view illustrating a region of the HDD unit surrounded by a line F7 of FIG. 5.

As shown in FIG. 2, a circuit board 14 is in the housing 6. The circuit board 14 is, for example, a main board. A first connector 15 is mounted on the circuit board 14 (see FIG. 4). The first connector 15 is directly fixed to the circuit board 14. As shown in FIG. 7, the first connector 15 includes a header 16 (i.e., base portion) made of an insulating material and a plurality of terminal pins 17 protruding from the header 16. The header 16 is an example of a "first contact portion".

As shown in FIG. 2, the main unit 2 includes an HDD receiving portion 21 in the housing 6 and an HDD unit 22 in the HDD receiving portion 21. The HDD receiving portion 21 is an example of a "receiver". The HDD unit 22 is an example of a "unit".

Figure 4:
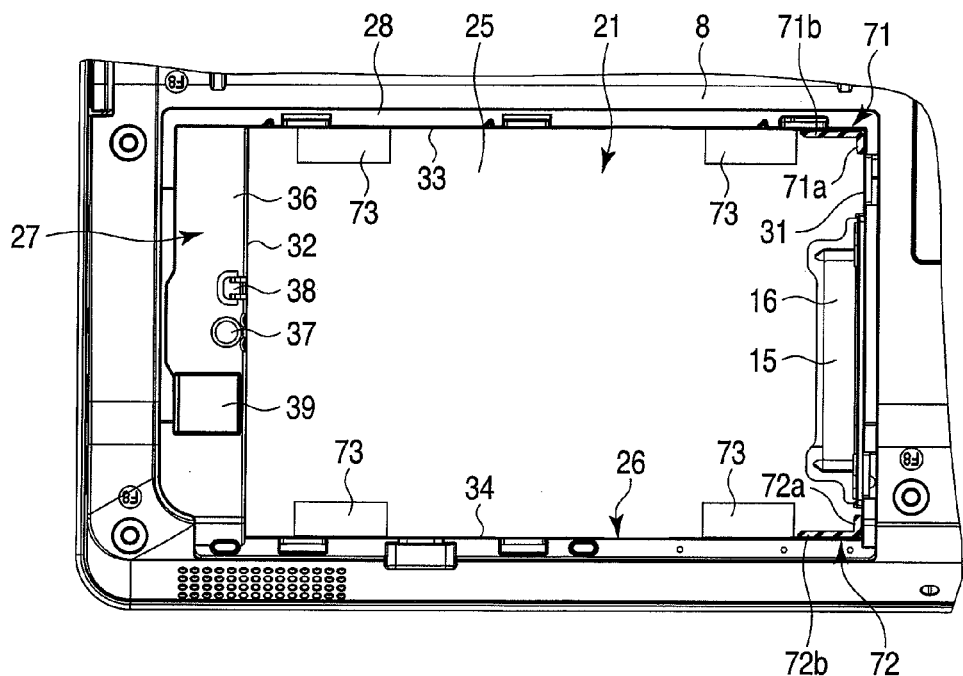
FIG. 4 is an exemplary plan view illustrating the inside of an HDD receiving portion shown in FIG. 2.
Figure 9:
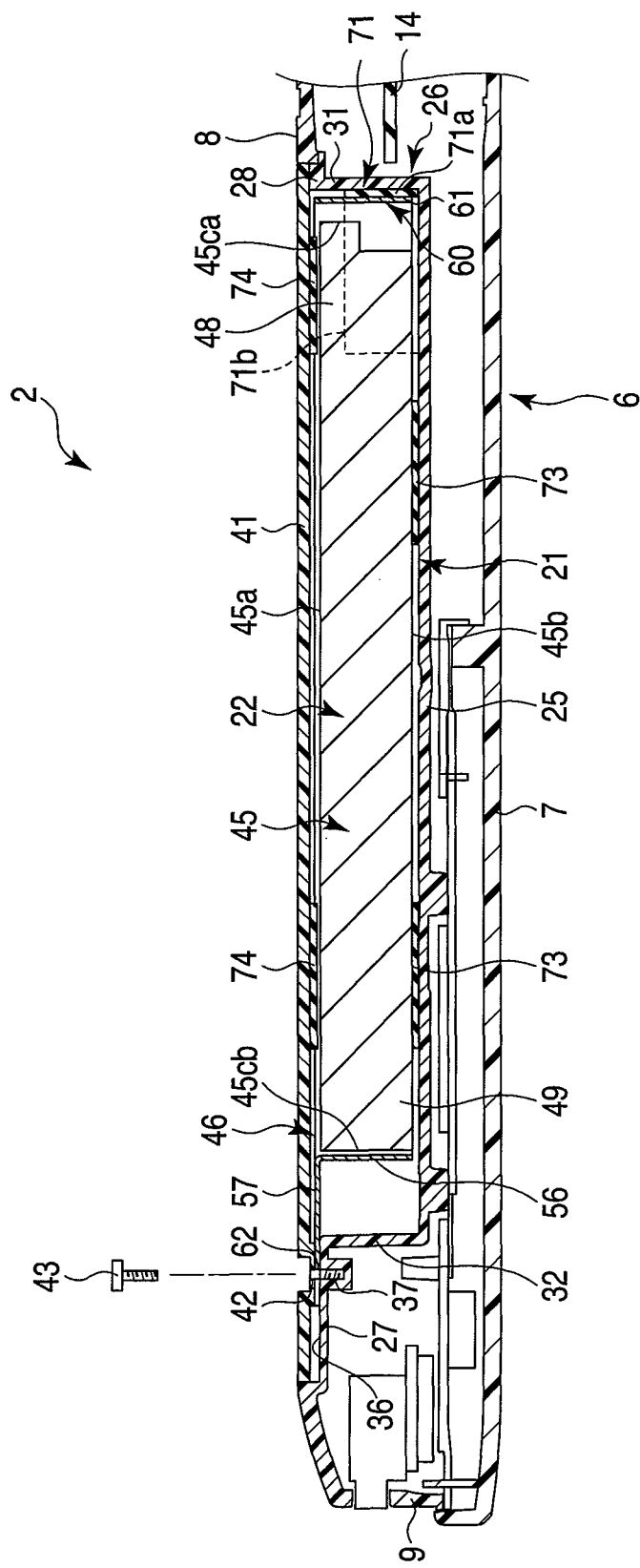
FIG. 9 is an exemplary cross-sectional view illustrating the HDD receiving portion taken along a line F9-F9 of FIG. 6.

As shown in FIGS. 4 and 9, the HDD receiving portion 21 is a recessed portion recessed from the lower wall 8 into the housing 6. The HDD receiving portion 21 has, for example, a substantially rectangular shape. As shown in FIG. 7, the HDD receiving portion 21 includes an opening portion 23 through which the first connector 15 is exposed. The first connector 15 is in the HDD receiving portion 21 through the opening portion 23.

Figure 5:
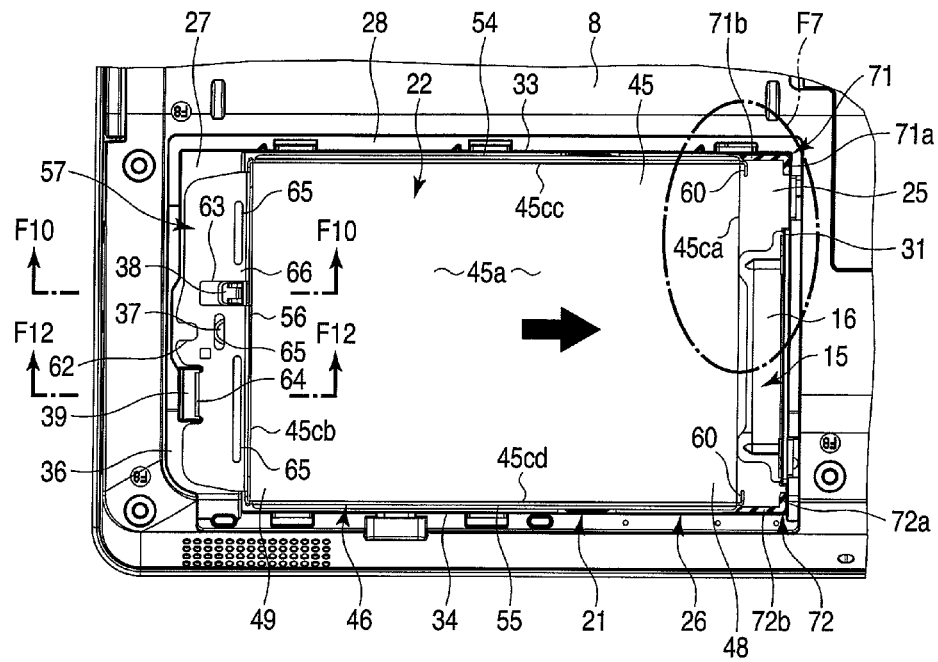
FIG. 5 is an exemplary plan view illustrating the attachment of the HDD unit to the HDD receiving portion shown in FIG. 4 (before the HDD unit slides)

The HDD unit 22 is directly connected to the first connector 15 without using a flexible cable. The attachment of the HDD unit 22 to the HDD receiving portion 21 is performed as follows, which will be described in detail below. That is, as shown in FIG. 5, first, the HDD unit 22 is attached along a substantially vertical direction to the side of the first connector 15. Then, the HDD unit 22 is made to slide to the first connector 15 substantially in the horizontal direction (see an arrow in FIG. 5). In this way, the HDD unit 22 is connected to the first connector 15.

In the specification, the front, rear, left, and right sides are defined based on the sliding direction of the HDD unit 22. That is, one side of the HDD unit 22 where the first connector 15 is positioned is defined as the front side, and another side thereof opposite to the first connector 15 is defined as the rear side.

As shown in FIGS. 4 and 9, the HDD receiving portion 21 includes a bottom wall 25, a rising wall 26, a fixing portion 27, and a cover mounting portion 28. Each of the bottom wall 25 and the rising wall 26 is an example of a "wall".

The bottom wall 25 is recessed from the lower wall 8 and has, for example, a substantially rectangular shape. For example, the bottom wall 25 extends substantially in the horizontal direction and is substantially parallel to the lower wall 8. The HDD unit 22 is placed on the bottom wall 25. The bottom wall 25 is larger than the HDD unit 22 in the longitudinal direction of the HDD unit 22. The HDD unit 22 can slide as described above along the bottom wall 25.

The rising wall 26 rises from the edge portion of the bottom wall 25, for example, four sides of the bottom wall 25, and extends to the lower wall 8. The rising wall 26 surrounds the HDD unit 22. The rising wall 26 includes first to fourth walls 31, 32, 33, and 34.

As shown in FIGS. 4 and 9, the first wall 31 rises in front of the HDD unit 22 and faces the HDD unit 22 in the longitudinal direction of the HDD unit 22. The opening portion 23 is provided in the first wall 31 and the first connector 15 is exposed through the opening portion 23. The second wall 32 rises on the rear side of the HDD unit 22 and faces the HDD unit 22 on the side opposite to the first wall 31. The third and fourth walls 33 and 34 rise on both sides of the HDD unit 22 in the lateral direction.

As shown in FIGS. 4 and 9, the fixing portion 27 is at one end portion of the HDD receiving portion 21 opposite to the first connector 15. The fixing portion 27 extends backward from the leading end portion of the second wall 32. The fixing portion 27 includes a mounting surface 36, a screw hole 37, a hook 38, and a concave portion 39. Each of the hook 38 and the concave portion 39 is an example of an "engaged portion".

Figure 10:
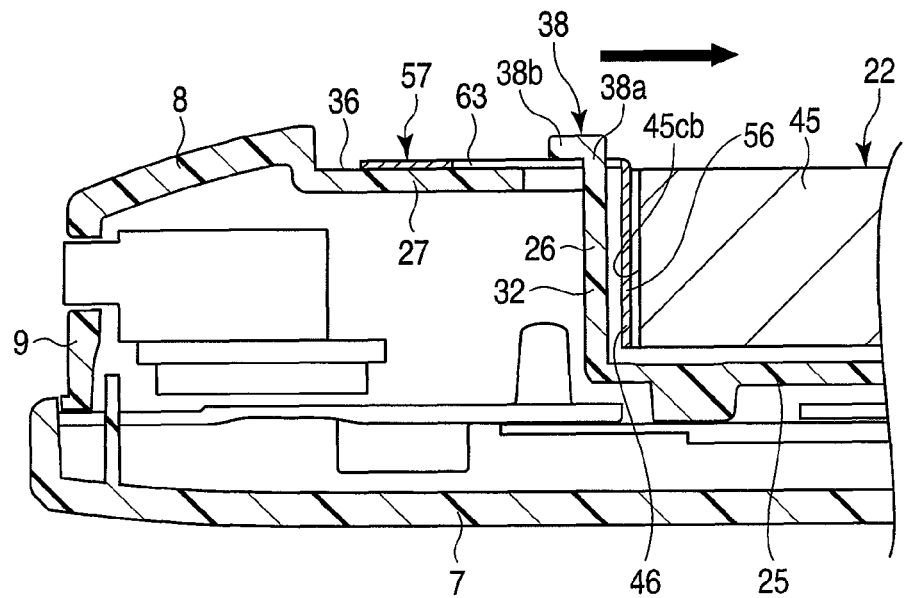
FIG. 10 is an exemplary cross-sectional view illustrating an attachment portion taken along a line F10-F10 of FIG. 5.

The mounting surface 36 extends substantially in the horizontal direction and is substantially parallel to the bottom wall 25. For example, the screw hole 37 is substantially at the center of the fixing portion 27. As shown in FIG. 10, the hook 38 includes a first portion 38a protruding from the mounting surface 36 and a second portion 38b bent from the leading end portion of the first portion 38a.

The second portion 38b protrudes in a direction opposite to the sliding direction of the HDD unit 22. A gap is between the second portion 38b and the mounting surface 36 and is substantially equal to the thickness of an attachment portion 57 of an HDD 45, which will be described below. As shown in FIG. 12, the concave portion 39 is recessed from the mounting surface 36 into the housing 6.

As shown in FIG. 2, the cover mounting portion 28 extends substantially in the horizontal direction from the leading end portion of the rising wall 26 to the outside of the HDD receiving portion 21. As shown in FIGS. 2 and 9, an HDD cover 41 is placed on the cover mounting portion 28. The HDD cover 41 includes a through hole 42. The through hole 42 faces the screw hole 37 of the HDD receiving portion 21. A screw 43 is inserted into the screw hole 37 through the through hole 42 to fix the HDD cover 41 to the housing 6. The HDD cover 41 covers the HDD unit 22 and the HDD receiving portion 21 from the outside of the housing 6.

Figure 3:
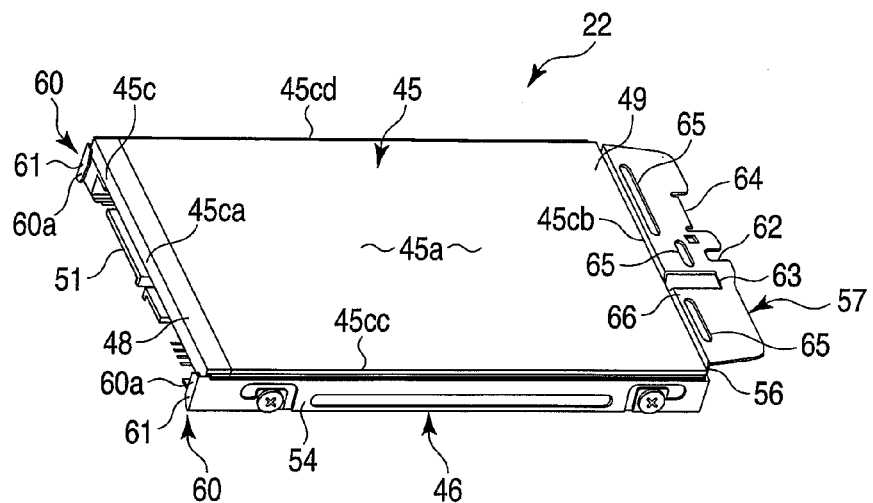
FIG. 3 is an exemplary perspective view illustrating an HDD unit shown in FIG. 2.

As shown in FIG. 3, the HDD unit 22 includes the HDD 45 and a holder 46 holding the HDD 45. The HDD 45 is an example of a "module" and is also an example of a "storage medium". The holder 46 is an example of an "attachment metal plate".

The HDD 45 has a rectangular plate shape. The HDD 45 includes first and second main surfaces 45a and 45b and a circumferential surface 45c. The first and second main surfaces 45a and 45b extend substantially in parallel to a magnetic disk of the HDD 45. As shown in FIG. 9, the first main surface 45a faces the inner surface of the HDD cover 41. The second main surface 45b faces the bottom wall 25 of the HDD receiving portion 21.

The circumferential surface 45c includes a front surface 45ca, a rear surface 45cb, a first side surface 45cc (e.g., left surface), and a second side surface 45cd (e.g., right surface). The front surface 45ca, the rear surface 45cb, the first side surface 45cc, and the second side surface 45cd face the first wall 31, the second wall 32, the third wall 33, and the fourth wall 34 of the HDD receiving portion 21, respectively.

As shown in FIG. 3, the HDD 45 includes first and second end portions 48 and 49 in the longitudinal direction. A second connector 51 is provided at the first end portion 48. The second connector 51 is directly connected to (that is, engaged with) the first connector 15. That is, when the HDD unit 22 slides as described above, the first connector 15 is inserted into the second connector 51.

As shown in FIG. 7, the second connector 51 includes a socket 52 made of an insulating material. The socket 52 includes a plurality of insertion holes into which the terminal pins 17 are inserted. The socket 52 is an example of a "second contact portion".

The first and second connectors 15 and 51 have a predetermined effective engagement length. The term "effective engagement length" means the range in which the first and second connectors 15 and 51 are electrically connected to each other before the first and second connectors 15 are 51 are not completely inserted into each other, that is, before the first and second connectors 15 and 51 are completely engaged with each other.

Figure 8:
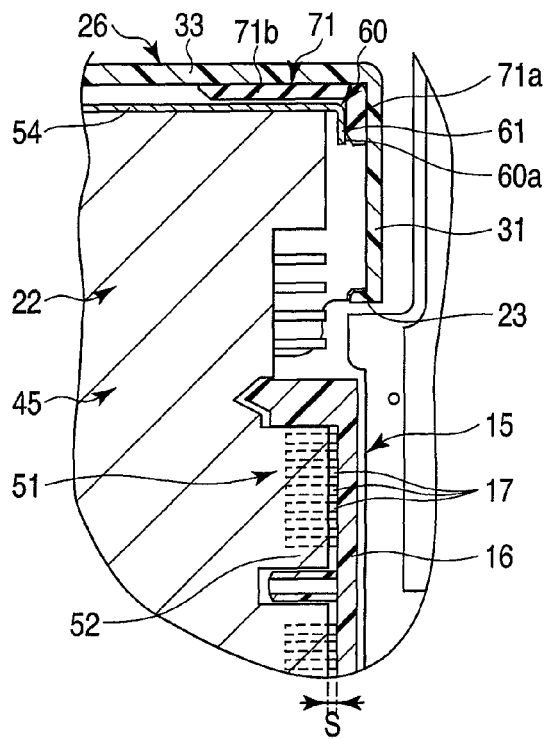
FIG. 8 is an exemplary cross-sectional view illustrating a region of the HDD unit surrounded by a line F8 of FIG. 6.

The effective engagement length of the first and second connectors 15 and 51 is, for example, about 1.5 mm. That is, as shown in FIG. 8, when a gap S between the first and second connectors 15 and 51 (that is, the gap S between the header 16 and the socket 52) is equal to or less than 1.5 mm, the first and second connectors 15 and 51 are electrically connected to each other.

The HDD unit 22 is held to be movable between a first position where electrical connection to the first connector 15 is maintained and the header 16 is separated from the socket 52 and a second position where the header 16 and the socket 52 contact each other. The first position is within the range of the effective engagement length of the first and second connectors 15 and 51, and the gap S is present between the header 16 and the socket 52 at the first position.

As shown in FIGS. 3 and 5, the holder 46 is, for example, a metal plate. The holder 46 includes first and second holding portions 54 and 55, a connecting portion 56, and an attachment portion 57. The first and second holding portions 54 and 55 are raised plates and face the first and second side surfaces 45cc and 45cd of the HDD 45, respectively.

The first and second holding portions 54 and 55 extend in the longitudinal direction of the HDD 45 along the first and second side surfaces 45cc and 45cd. The first and second holding portions 54 and 55 extend substantially over the entire length of the HDD 45 in the longitudinal direction. The HDD 45 is sandwiched between the first and second holding portions 54 and 55. The HDD 45 is fixed to the first and second holding portions 54 and 55 by, for example, screws.

As shown in FIGS. 5 and 7, a contact portion 60 (i.e., a cushion portion; a second buffer) is at the leading end portion of each of the first and second holding portions 54 and 55. The contact portion 60 protrudes toward the first wall 31 (that is, buffer members 71 and 72, which will be described below) to a region that deviates from the side of the HDD 45. The contact portion 60 protrudes in a plate shape and includes a bent portion 61 at the leading end portion thereof. The bent portion 61 is formed by bending the plate-shape contact portion 60 in the thickness direction thereof.

A pair of contact portions 60 in the first and second holding portions 54 and 55 is bent so as to face each other, that is, so as to face the second connector 51. The bent portion 61 includes a contact surface 60a facing the first wall 31. The contact surface 60a is substantially parallel to the first wall 31.

As shown in FIGS. 3 and 9, the connecting portion 56 is a raised plate and faces the rear surface 45cb of the HDD 45. The connecting portion 56 connects the rear end portions of the first and second holding portions 54 and 55.

The attachment portion 57 extends backward from one end portion of the connecting portion 56 close to the HDD cover. The attachment portion 57 is placed on the mounting surface 36 of the HDD receiving portion 21. The attachment portion 57 includes a cutout portion 62, an engaging hole 63, an engaging portion 64, and slits 65. Each of the engaging hole 63 and the engaging portion 64 is an example of an "engaging portion".

Figure 6:
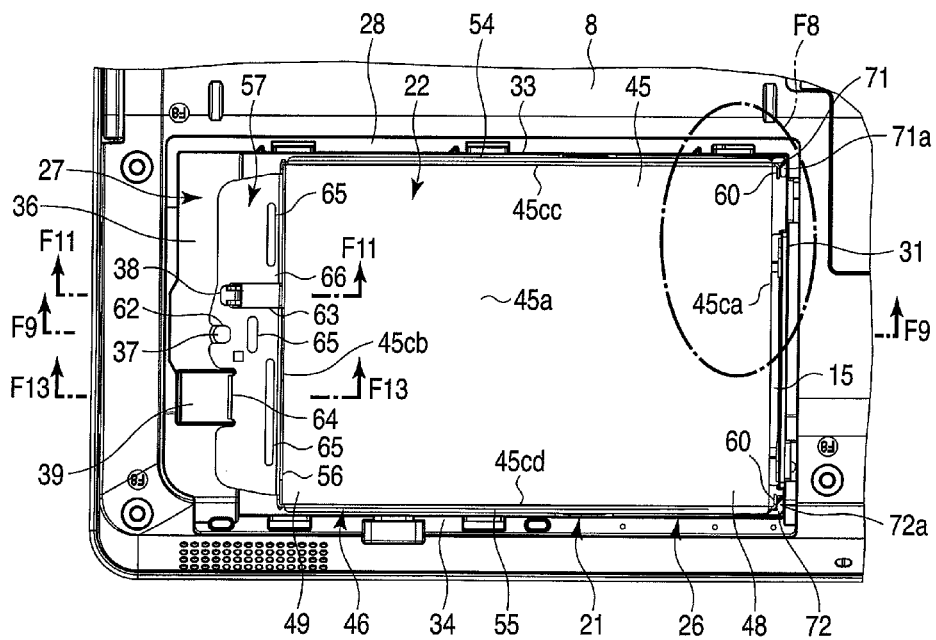
FIG. 6 is an exemplary plan view illustrating the attachment of the HDD unit to the HDD receiving portion shown in FIG. 4 (after the HDD unit slides)

As shown in FIGS. 3 and 5, the cutout portion 62 is at the rear end portion of the attachment portion 57. As shown in FIG. 6, when the HDD unit 22 slides and is connected to the first connector 15, the cutout portion 62 faces the screw hole 37 of the fixing portion 27. The screw 43 communicating with the through hole 42 of the HDD cover 41 is engaged with the screw hole 37 through the cutout portion 62. In this way, the movement of the HDD unit 22 in the backward direction is regulated by the screw 43 engaged with the screw hole 37, and the HDD unit 22 is fixed at that position.

Figure 11:
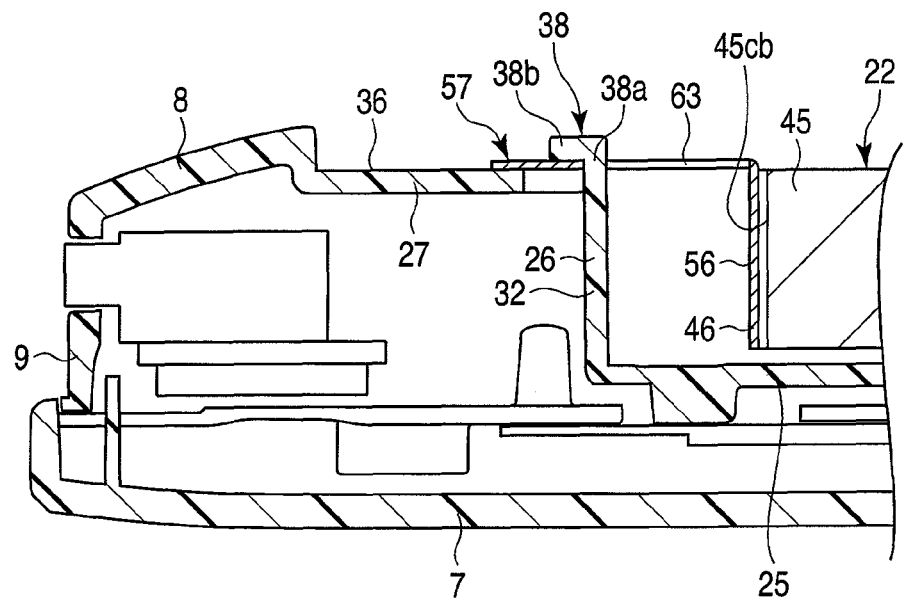
FIG. 11 is an exemplary cross-sectional view illustrating an attachment portion taken along a line F11-F11 of FIG. 6.

As shown in FIGS. 5 and 6, the hook 38 is inserted into the engaging hole 63. The engaging hole 63 has a predetermined length in the sliding direction of the HDD unit 22. As shown in FIG. 10, when the HDD unit 22 is placed on the HDD receiving portion 21 substantially in the vertical direction, the hook 38 passes through the engaging hole 63. Then, when the HDD unit 22 slides toward the first connector 15 substantially in the horizontal direction, as shown in FIG. 11, a portion of the attachment portion 57 is inserted into the gap between the hook 38 and the mounting surface 36. In this way, the HDD unit 22 is prevented from floating from the HDD receiving portion 21.

As shown in FIGS. 5 and 6, for example, the engaging portion 64 is bent so as to get into the concave portion 39 and is engaged with the concave portion 39. The concave portion 39 has a predetermined length in the sliding direction of the HDD unit 22. As shown in FIG. 12, when the HDD unit 22 is placed on the HDD receiving portion 21 substantially in the vertical direction, the engaging portion 64 gets into the concave portion 39. Then, when the HDD unit 22 slides toward the first connector 15 substantially in the horizontal direction, as shown in FIG. 13, for example, the engaging portion 64 faces the end surface 39a of the concave portion 39 with a small distance therebetween. The engaging portion 64 may come into contact with the end surface 39a.

As shown in FIG. 3, the slit 65 extends in the lateral direction (that is, a direction intersecting the sliding direction) of the HDD unit 22. For example, a plurality of slits 65 is provided. For example, the total length of the slits 65 is equal to or more than half the length of the attachment portion 57 in the lateral direction. In this way, a weak portion 66 weaker than other portions is formed in a portion of the attachment portion 57.

As shown in FIG. 4, the first and second buffer members 71 and 72 are in the HDD receiving portion 21. Each of the first and second buffer members 71 and 72 is an example of a "buffer". For convenience of description, in FIGS. 4, 5, and 6, the first and second buffer members 71 and 72 are hatched.

For example, the first and second buffer members 71 and 72 are provided on the rising wall 26 of the housing 6. The first and second buffer members 71 and 72 are, for example, elastic members, specifically, rubber members. The first and second buffer members 71 and 72 have, for example, an L shape, and are provided at the corner portions of the HDD receiving portion 21.

As shown in FIG. 7, the first buffer member 71 includes first and second portions 71a and 71b formed integrally with each other. The first wall 31 faces the contact portion 60 of the holder 46 in the direction in which the first connector 15 faces the second connector 51. The first portion 71a is attached to the first wall 31 and faces the contact portion 60 of the holder 46. The first portion 71a is substantially parallel to the contact surface 60a of the contact portion 60.

The second portion 71b is bent with respect to the first portion 71a. The second portion 71b is attached to the third wall 33 and faces the first holding portion 54 of the holder 46. The first portion 71a is thicker than the second portion 71b.

As shown in FIG. 4, similarly, the second buffer member 72 includes first and second portions 72a and 72b formed integrally with each other. The first portion 72a is attached to the first wall 31 and faces the contact portion 60 of the holder 46. The second portion 72b is bent with respect to the first portion 72a. The second portion 72b is attached to the fourth wall 34 and faces the second holding portion 55 of the holder 46. The first portion 72a is thicker than the second portion 72b.

As shown in FIGS. 6 and 8, when the second connector 51 of the HDD unit 22 is connected to the first connector 15, the first portions 71a and 72a of the first and second buffer members 71 and 72 come into contact with the contact portion 60 of the holder 46. That is, the first and second buffer members 71 and 72 come into contact with the holder 46 while the HDD unit 22 is moved from the first position to the second position.

The first portions 71a and 72a of the first and second buffer members 71 and 72 are interposed between the first wall 31 and the holder 46 such that the gap S remains between the first connector 15 and the second connector 51 in the range in which the first connector 15 is electrically connected to the second connector 51 (that is, in the range of the effective engagement length).

The gap S is, for example, about 0.5 mm, but is not limited thereto. The gap S may have any value in the range of the effective engagement length. The term "the gap remains between the first connector and the second connector" means that the socket 52 does not come into contact with the header 16, but there is the gap S between the header 16 and the socket 52, as shown in FIG. 8.

As shown in FIG. 4, a plurality of third buffer members 73 is provided in the HDD receiving portion 21. As shown in FIG. 9, the third buffer members 73 face the second main surface 45b of the HDD 45. A plurality of fourth buffer members 74 is provided in the HDD cover 41. The fourth buffer members 74 face the first main surface 45a of the HDD 45. The fourth buffer members 74 are opposite to the third buffer members 73 with the HDD unit 22 interposed therebetween. Each of the third and fourth buffer members 73 and 74 is, for example, an elastic member, specifically, a rubber member.

Next, the attachment of the HDD unit 22 to the HDD receiving portion 21 will be described.

The HDD unit 22 is attached to the HDD receiving portion 21 with the electronic apparatus 1 turned upside down, that is, with the lower wall 8 facing upward. As shown in FIG. 5, first, the HDD unit 22 is placed in the HDD receiving portion 21 whose upper side is exposed, substantially in the vertical direction. In this way, as shown in FIGS. 10 and 12, the hook 38 passes through the engaging hole 63, and the engaging portion 64 engages with the concave portion 39.

Then, as shown in FIG. 6, the HDD unit 22 slides to the first connector 15 substantially in the horizontal direction. In this case, the second portions 71b and 72b of the first and second buffer members 71 and 72 and the third buffer members 73 serve as guides that guide the HDD unit 22.

Then, as shown in FIG. 8, the contact portion 60 of the holder 46 comes into contact with the first portions 71a and 72a of the first and second buffer members 71 and 72, whereby the sliding of the HDD unit 22 stops. In this case, the gap S remains between the first and second connectors 15 and 51.

As shown in FIGS. 11 and 13, when the HDD unit 22 is connected to the first connector 15, the attachment portion 57 is partially below the hook 38. In this way, the HDD unit 22 is temporarily fixed to the HDD receiving portion 21. In addition, the engaging portion 64 faces the end surface 39a of the concave portion 39.

Then, as shown in FIGS. 2 and 9, the HDD cover 41 is placed on the cover mounting portion 28. Then, the screw 43 is inserted into the screw hole 37 of the HDD receiving portion 21 through the through hole 42 of the HDD cover 41 and the cutout portion 62 of the holder 46. In this way, the HDD unit 22 is fixed to the housing 6 by the screw with the gap S remaining between the first and second connectors 15 and 51.

Next, the operation of the electronic apparatus 1 will be described.

When there is the gap S between the first and second connectors 15 and 51, an external impact applied, for example, when the electronic apparatus 1 is dropped accidentally is less likely to be transmitted between the first and second connectors 15 and 51. Therefore, even though an impact is applied, the first connector 15 and the HDD unit 22 are less likely to be damaged.

That is, even though an impact to move the HDD unit 22 in the sliding direction is applied, the HDD unit 22 is less likely to be moved to the first connector 15 since the contact portions 60 of the holder 46 come into contact with the first and second buffer members 71 and 72. Therefore, it is easy to maintain the gap S between the HDD unit 22 and the first connector 15 and excessive force is less likely to be applied to the HDD unit 22 and the first connector 15.

When an external impact is applied, the contact portion 60 of the holder 46, which is a plate member, is bent to partially absorb the impact transmitted to the HDD 45. Therefore, it is possible to suppress a strong impact applied to the HDD 45.

When an external impact is applied, the attachment portion 57 partially below the hook 38 comes into contact with the first portion 38a of the hook 38. In addition, the engaging portion 64 comes into contact with the end surface 39a of the concave portion 39. That is, the engaging hole 63 and the engaging portion 64 come into contact with the hook 38 and the concave portion 39 such that the gap S remains between the first and second connectors 15 and 51 in the range in which the first connector 15 is electrically connected to the second connector 51. In this way, the gap S between the first and second connectors 15 and 51 is reliably maintained, and the damage of the HDD unit 22 and the first connector 15 is suppressed.

When an impact is applied in a direction opposite to the sliding direction, that is, in a direction in which the HDD unit 22 is removed from the first connector 15, the weak portion 66 of the attachment portion 57 is bent to absorb the impact. In this way, the force applied to the HDD 45 is reduced.

When an impact is applied in the lateral direction of the HDD unit 22, the second portions 71b and 72b of the first and second buffer members 71 and 72 protect the HDD unit 22. In addition, when an impact is applied in the thickness direction of the HDD unit 22, the third and fourth buffer members 73 and 74 protect the HDD unit 22.

Figure 17:
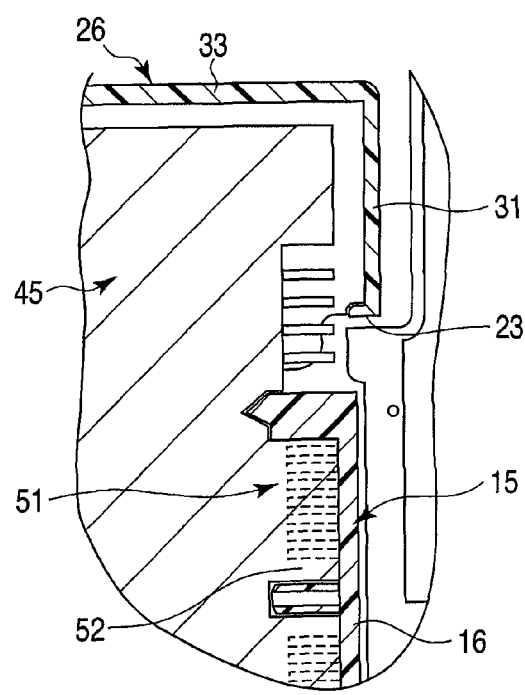
FIG. 17 is an exemplary cross-sectional view illustrating an HDD receiving portion related to the above embodiments.

According to this structure, it is possible to improve the impact resistance of the electronic apparatus 1. For comparison, FIG. 17 shows an electronic apparatus in which there is no gap between the first and second connectors 15 and 51. The socket 52 is in contact with the header 16. According to this structure, for example, when the electronic apparatus 1 is dropped accidentally, there is a concern that a strong impact will be transmitted between the first and second connectors 15 and 51 to damage the first connector 15 and the HDD 45.

However, in the structure according to this embodiment, the buffer members 71 and 72 are interposed between the first wall 31 and the holder 46 such that the gap S remains between the first and second connectors 15 and 51. Therefore, even though a strong impact is applied to the electronic apparatus 1, the direct contact between the first and second connectors 15 and 51 is suppressed. In this way, the first connector 15 and the HDD unit 22 are less likely to be damaged.

Therefore, it is possible to improve the impact resistance of the electronic apparatus 1 in which the HDD unit 22 is directly connected to the connector 15 of the circuit board 14 without using a flexible cable. The flexible cable is expensive. Therefore, when the flexible cable is omitted, it is possible to reduce the manufacturing cost of the electronic apparatus 1. In addition, it is possible to reduce the number of components or the weight of the electronic apparatus 1. Therefore, it is easy to manage components.

Since the buffer members 71 and 72 are provided on the first wall 31 facing the holder 46 in the direction in which the first connector 15 faces the second connector 51, the buffer members 71 and 72 reliably get into between the first wall 31 and the holder 46. Therefore, it is easy to maintain the gap S between the first and second connectors 15 and 51.

The holder 46 includes the contact portions 60 that protrude toward the buffer members 71 and 72 in a plate shape and include bent portions at the leading end portions thereof, and the contact portions 60 come into contact with the buffer members 71 and 72. In this case, when a strong impact is applied, the plate-shaped contact portions 60 can be bent to partially absorb the impact. In this way, it is possible to further reduce the impact applied to the HDD 45. When the buffer members 71 and 72 are provided at the corner portions of the HDD receiving portion 21, it is easy to absorb the impact.

When the holder 46 is fixed to the housing 6 by the screw 43 with the gap S remaining between the first and second connectors 15 and 51, the screw 43 also contributes to maintaining the gap S. When the holder 46 includes the engaging hole 63 and the engaging portion 64 that come into contact with the hook 38 and the concave portion 39 such that the gap S remains between the first and second connectors 15 and 51, it is even easier to maintain the gap S. The engaging hole 63 and the engaging portion 64 contribute to improving the impact resistance of the electronic apparatus 1. When the buffer members 71 and 72 are elastic members, it is possible to improve the impact absorption function of the buffer members 71 and 72.

According to the structure of this embodiment, when the HDD unit 22 is attached, the HDD unit 22 is temporarily fixed. Therefore, it is possible to fix both the HDD cover 41 and the HDD unit 22 with one screw 43. In this way, it is possible to reduce the number of screws. According to the structure of this embodiment, the HDD unit 22 is connected to the first connector 15 at the same time as it is attached. Therefore, it is easy to perform an assembly process, as compared to a structure using a flexible cable. In this way, it is possible to improve manufacturability.

(Second Embodiment)

Next, an electronic apparatus 1 according to a second embodiment will be described with reference to FIG. 14. In the second embodiment, components having the same or similar functions as those in the first embodiment are denoted by the same reference numerals and a description thereof will be omitted. Structures other than the following structure are the same as those in the first embodiment.

Figure 14:
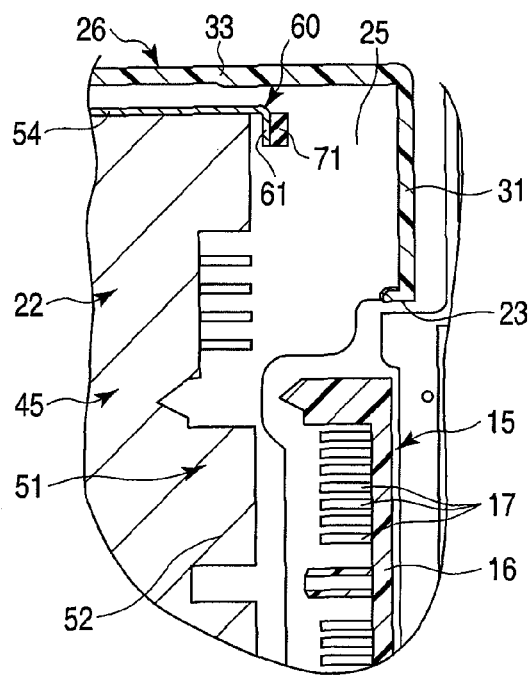
FIG. 14 is an exemplary cross-sectional view illustrating a buffer of an electronic apparatus according to a second embodiment.

As shown in FIG. 14, the buffer members 71 and 72 according to this embodiment are provided in the holder 46. The buffer members 71 and 72 are, for example, elastic members, specifically, rubber members. The buffer members 71 and 72 come into contact with the first wall 31 while the HDD unit 22 is moved from the first position to the second position.

According to this structure, similar to the first embodiment, it is possible to improve the impact resistance of the electronic apparatus 1.

(Third Embodiment)

Next, an electronic apparatus 1 according to a third embodiment will be described with reference to FIG. 15. In the third embodiment, components having the same or similar functions as those in the first embodiment are denoted by the same reference numerals and a description thereof will be omitted. Structures other than the following structure are the same as those in the first embodiment.

Figure 15:
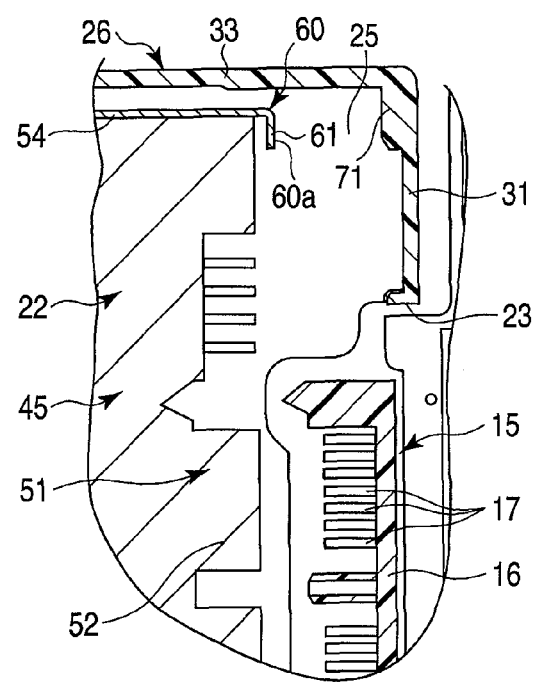
FIG. 15 is an exemplary cross-sectional view illustrating a buffer of an electronic apparatus according to a third embodiment.

As shown in FIG. 15, buffers 71 and 72 according to this embodiment are formed as a portion of the housing 6. The buffers 71 and 72 are convex portions formed integrally with the first wall 31 and made of a synthetic resin.

According to this structure, similar to the first embodiment, it is possible to improve the impact resistance of the electronic apparatus 1.

(Fourth Embodiment)

Next, an electronic apparatus 1 according to a fourth embodiment will be described with reference to FIG. 16. In the fourth embodiment, components having the same or similar functions as those in the first embodiment are denoted by the same reference numerals and a description thereof will be omitted. Structures other than the following structure are the same as those in the first embodiment.

Figure 16:
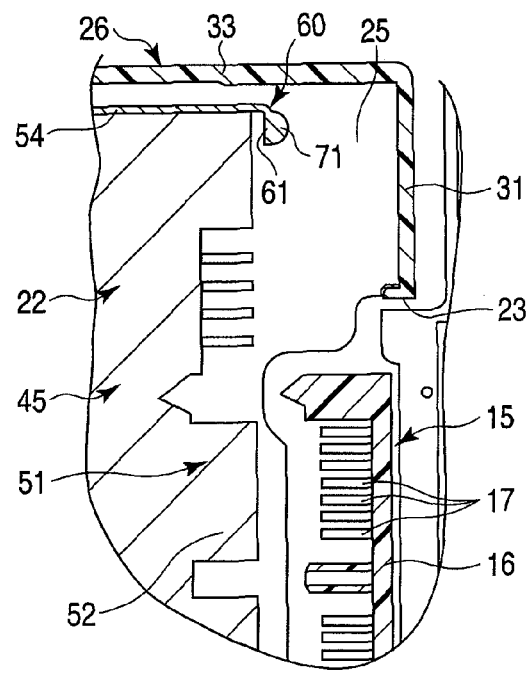
FIG. 16 is an exemplary cross-sectional view illustrating a buffer of an electronic apparatus according to a fourth embodiment.

As shown in FIG. 16, the buffers 71 and 72 according to this embodiment are in the holder 46. The buffers 71 and 72 are convex portions formed integrally with the holder 46 and made of, for example, a metal material.

According to this structure, similar to the first embodiment, it is possible to improve the impact resistance of the electronic apparatus 1.

The electronic apparatuses 1 according to the first to fourth embodiments have been described above, but the embodiments are not limited thereto. The components according to the first to fourth embodiments may be appropriately combined with each other. The invention is not limited to the above-described embodiments, but various modifications and changes of the components can be made without departing from the scope and spirit of the invention at the implementation stage.

In the above-described embodiments, the buffers come into contact with the contact portions 60 of the holder 46, but the invention is not limited thereto. For example, the buffers may come into contact with any surface of the holder 46, such as a side surface, the top, or the bottom. In a normal state, the buffers may or may not come into contact with the first wall 31 or the holder 46. That is, in the normal state, the buffers may be separated from the first wall 31 and the holder 46, and when an impact is applied, the buffers may come into contact with the first wall 31 or the holder 46 such that the gap S between the first and second connectors 15 and 51 is maintained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing;
a circuit board in the housing, comprising a first connector comprising a first terminal and a first insulator, the first insulator supporting the first terminal;
a unit comprising a second connector comprising a second terminal and a second insulator, the second terminal configured to electrically connect to the first terminal from a first position to a second position closer to the first connector than the first position, the second insulator supporting the second terminal and configured to come into contact with the first insulator at the second position; and
a first buffer configured to be separated from at least one of the housing and the unit at the first position and to come into contact with at least one of a portion of the housing and the unit at a position between the first position and the second position in order to suppress contact between the first insulator and the second insulator.

2. The electronic apparatus of claim 1,
wherein the first buffer is an elastic member.

3. The electronic apparatus of claim 1,
wherein the first buffer is a portion of the housing.

4. The electronic apparatus of claim 1,
wherein the first buffer is provided on the unit.

5. An electronic apparatus comprising:
a housing comprising a wall;
a circuit board in the housing, comprising the first connector;
the first connector comprising a terminal and a first insulator supporting the terminal;
a unit comprising a second connector comprising a second insulator, the unit configured to move between a first position where a gap remains between the first insulator and the second insulator, and the terminal of the first connector contacts the second connector and the first connector is electrically connected to the second connector, and a second position which is closer to the first connector than the first position and where the first insulator comes into contact with the second insulator; and
a buffer between the unit and the wall, the buffer configured to comprise a gap between the buffer and at least one of the wall and the unit at the first position, and to be sandwiched between the wall and the unit before the unit, which moves toward the second position from the first position, reaches the second position, and exert reaction force on the unit.

6. The electronic apparatus of claim 1,
wherein the first buffer is configured to support the unit at a third position where a gap remains between the first insulator and the second insulator, between the first position and the second position, when an external force is not exerted on the electronic apparatus.

7. The electronic apparatus of claim 6,
wherein the unit comprises a rigid attaching portion fixed to the housing at the third position.

8. The electronic apparatus of claim 7,
wherein the unit comprises a first end and a second end, the first end configured to come into contact with the first buffer, the second end located on an opposite side of the first end and comprising the attaching portion.

9. The electronic apparatus of claim 1,
wherein the housing comprises a wall comprising the first buffer,
the unit comprises a module and a holder, the module comprising the second connector, the holder holding the module, and
the first buffer is configured to be separated from the module and to come into contact with the holder.

10. The electronic apparatus of claim 9,
wherein the holder comprises a second buffer configured to be deformed by an impact applied to the electronic apparatus externally, and
the first buffer configured to come into contact with the second buffer.

11. The electronic apparatus of claim 10,
wherein the second buffer protrudes from the holder toward the first buffer in a plate shape and comprises a bent portion comprising a gap between the bent portion and an end of the module, and at least a part of the second buffer configured to bend in the gap in order to buffer the impact when the impact is applied.

12. The electronic apparatus of claim 5,
wherein the buffer is configured to support the unit at a third position where a gap remains between the first insulator and the second insulator, between the first position and the second position, when an external force is not exerted on the electronic apparatus.

13. The electronic apparatus of claim 12,
wherein the unit comprises a rigid attaching portion fixed to the housing at the third position.

14. The electronic apparatus of claim 13,
wherein the unit comprises a module and a holder, the module comprising the second connector, the holder holding the module,
the holder comprises a first end and a second end, the first end configured to come into contact with the buffer, the second end located on an opposite side of the first end and comprising the attaching portion, and
the module is configured to be supported at the third position from two directions by the buffer and the attaching portion.

15. The electronic apparatus of claim 5,
wherein the unit comprises a module and a holder, the module comprising the second connector, the holder holding the module, and
the buffer is configured to be separated from the module and to come into contact with the holder.

16. The electronic apparatus of claim 15,
wherein the holder comprises a contact portion protruding from the holder toward the buffer in a plate shape and bent in order to comprise a gap between the contact portion and an end of the module, and
the contact portion is configured to come into contact with the buffer while the unit is moved from the first position to the second position, and configured to buffer an impact as the contact portion bend in the gap when the impact is applied.

* * * * *